(12) United States Patent
Rademacher et al.

(10) Patent No.: US 11,746,791 B2
(45) Date of Patent: Sep. 5, 2023

(54) SCROLL HOUSING SUBASSEMBLY AND METHOD FOR SERVICING A SCROLL HOUSING SUBASSEMBLY

(71) Applicant: Valeo North America, Inc., Auburn Hills, MI (US)

(72) Inventors: Gregory Rademacher, Auburn Hills, MI (US); Jason Kreucher, Auburn Hills, MI (US); Richard Sikorski, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 264 days.

(21) Appl. No.: 16/444,584

(22) Filed: Jun. 18, 2019

(65) Prior Publication Data
US 2020/0400146 A1 Dec. 24, 2020

(51) Int. Cl.
*B60H 1/00* (2006.01)
*F04D 17/16* (2006.01)
*F04D 29/42* (2006.01)

(52) U.S. Cl.
CPC ......... *F04D 17/16* (2013.01); *B60H 1/00028* (2013.01); *B60H 1/00471* (2013.01); *B60H 1/00521* (2013.01); *F04D 29/4226* (2013.01)

(58) Field of Classification Search
CPC ............ B60H 1/00521; B60H 1/00471; B60H 1/00028; F04D 29/4226; F04D 17/16
(Continued)

(56) References Cited

U.S. PATENT DOCUMENTS 6,076,370 A * 6/2000 Da Silva ................ F24F 1/022
62/262
9,061,565 B2 * 6/2015 Kim .................... B60H 1/00507
(Continued)

FOREIGN PATENT DOCUMENTS

EP 0549475 A1 6/1993
JP H0834230 A 2/1996
(Continued)

OTHER PUBLICATIONS

Hwang, KR 10-2010-0029881 A English machine translation, Mar. 18, 2010 (Year: 2010).*
(Continued)

*Primary Examiner* — Avinash A Savani
*Assistant Examiner* — Ryan L Faulkner
(74) *Attorney, Agent, or Firm* — Osha Bergman Watanabe & Burton LLP

(57) ABSTRACT

A method for servicing a blower motor installed in a heating, ventilation, and air-conditioning (HVAC) assembly for a motor vehicle may include rotating a scroll housing subassembly of the HVAC assembly from an installed position to an extraction position. The method may include detaching a first securing element, the first securing element being distributed on the scroll housing subassembly and an evaporator housing subassembly of the HVAC assembly. The method may include removing the scroll housing subassembly from the HVAC assembly in a direction of extraction. The method may include that the scroll housing subassembly reaches the extraction position by axial rotation in a direction orthogonal to the direction of extraction. The method may include that the extraction position is a position at which the scroll housing subassembly is cleared for moving in the direction of extraction.

21 Claims, 12 Drawing Sheets

(58) Field of Classification Search
USPC .......................................................... 415/213
See application file for complete search history.

(56) References Cited

U.S. PATENT DOCUMENTS

2019/0176569 A1    6/2019  Hensler et al.
2020/0398635 A1*  12/2020  Rademacher ........ B60H 1/3227

FOREIGN PATENT DOCUMENTS

| JP | 3873812 B2      | 1/2007  |
| JP | 4946993 B2      | 6/2012  |
| JP | 2018111333 A    | 7/2018  |
| KR | 20080113666 A   | 12/2008 |
| KR | 20090059578 A   | 6/2009  |
| KR | 10-2010-0029881 A | 3/2010 |
| KR | 10-2018-0104791 A | 9/2018 |

OTHER PUBLICATIONS

Kim, KR 10-2018-0104791 A English machine translation, Sep. 27, 2018 (Year: 2018).*
International Search Report and Written Opinion in corresponding International Application No. PCT/US2020/038391, dated Oct. 6, 2020 (10 pages).
Extended European Search Report in corresponding European Application No. 20825425.0, dated Jun. 14, 2023 (7 pages).

* cited by examiner

SCROLL HOUSING SUBASSEMBLY AND METHOD FOR SERVICING A SCROLL HOUSING SUBASSEMBLY

BACKGROUND

In the automotive field, heating, ventilation, and/or air conditioning (HVAC) systems regulate the aerothermal parameters of the air circulated inside a passenger compartment. A blower motor is a device performing the functionality of a centrifugal fan coupled with a motor used in moving air or other gases in/out of a cabin of a motor vehicle. Blower motors are assembled adjacent to ducted housings that direct incoming/outgoing airflows in a specific direction or across a heat sink. Blower motors increase the speed and volume of an airflow using rotating impellers to move the airflows against the resistance caused by the ducted housings.

SUMMARY

In general, in one aspect, embodiments relate to a method for servicing a blower motor installed in an HVAC assembly for a motor vehicle. The method includes rotating a scroll housing subassembly of the HVAC assembly from an installed position to an extraction position. The method includes detaching a first securing element, the first securing element being distributed on the scroll housing subassembly and an evaporator housing subassembly of the HVAC assembly. The method includes removing the scroll housing subassembly from the HVAC assembly in a direction of extraction. The method includes that the scroll housing subassembly reaches the extraction position by axial rotation in a direction orthogonal to the direction of extraction. The method includes that the extraction position is a position at which the scroll housing subassembly is cleared for moving in the direction of extraction.

In general, in one aspect, embodiments relate to an HVAC assembly for a motor vehicle. The assembly includes a scroll housing subassembly, an evaporator housing subassembly, and an air inlet housing subassembly. The assembly includes a first securing element, the first securing element being distributed on the scroll housing subassembly and the evaporator housing subassembly and configured to detach at an extraction position. The assembly includes that the scroll housing subassembly is configured for rotating from an installed position to the extraction position, the scroll housing subassembly being configured for removal from the HVAC assembly at the extraction position. The assembly includes that the scroll housing subassembly reaches the extraction position by rotating axially in a direction orthogonal to a direction of extraction.

In general, in one aspect, embodiments relate to a scroll housing subassembly installed in an HVAC assembly for a motor vehicle. The subassembly includes a first securing element, the first securing element being distributed on the scroll housing subassembly and a evaporator housing subassembly and configured to detach at an extraction position. The subassembly includes a second securing element, the second securing element being distributed on the scroll housing subassembly and the evaporator housing subassembly and configured to detach at the extraction position. The subassembly includes a third securing element, the third securing element being distributed on the scroll housing subassembly and an air inlet housing subassembly and configured to detach at the extraction position. The subassembly is configured for rotation from an installed position to the extraction position, the scroll housing subassembly being configured for removal from the HVAC assembly at the extraction position. The subassembly reaches the extraction position by axial rotation in a direction orthogonal to a direction of extraction.

In one or more embodiments, the blower motor assembly may be configured for servicing allowing the HVAC module to be assembled in an up to down configuration (vertical) while still allowing the heater core to be serviced in a horizontal manner avoiding a limited vertical vehicle clearance. The blower motor assembly may be removed along with a blower scroll assembly as one assembly that reduces an area needed for part serviceability. In typical offset HVAC blower designs, the blower motor assembly is lowered into a foot well so the need for limited axial movement is not critical. As instrument panel space becomes more limited, the blower motor assembly is moving further into the instrument panel, accessibility is reduced. By using a combination of twist-lock feature and arcing and radial securing elements, the blower motor assembly is serviceable with an axial movement an extraction height and an extraction angle. The extraction height is a distance traveled by the scroll housing subassembly in the direction orthogonal to the direction of extraction from the installed position. The extraction angle is an angular distance traveled by twisting the scroll housing subassembly from the installed position. Serviceability of the blower motor in this manner allows for protection of the motor/wheel assembly balance when installing. The scroll housing subassembly acts to protect the wheel assembly from contact with other components causing balancing clip displacement.

Other aspects of the disclosure will be apparent from the following description and the appended claims.

DETAILED DESCRIPTION

Figure 1:
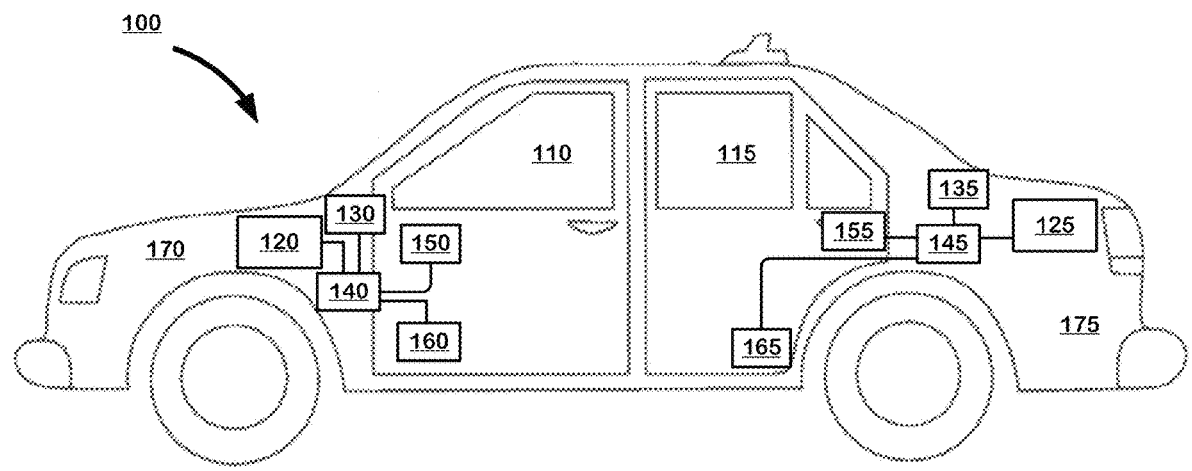
FIG. 1 shows a block diagram of an automotive system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include methods, assemblies, and systems directed to servicing a heater core installed in an HVAC system. A heater core may be used in HVAC vehicle applications, such as for example, in heavy motor vehicles that may depend on programmed HVAC systems to adapt a cabin temperature. In these applications, a smaller footprint may be achieved by installing a heater core in an HVAC assembly, or sub-assemblies, during a manufacturing process or assembling process of the HVAC assembly. The heater core may be configured for servicing without removing any other part of the HVAC assembly assembled during the manufacturing process. In one or more embodiments, the heater core may be installed in the HVAC system in a first direction and the heater core may be serviced in a second direction.

FIG. 1 shows a block diagram of a system in accordance with one or more embodiments. FIG. 1 shows a heating, ventilation, and air-conditioning (HVAC) system (100) for a motor vehicle according to one or more embodiments, having various equipment that is powered during regular operation of the motor vehicle. The HVAC system (100) may be a split HVAC system configured to connect two HVAC subassemblies for the HVAC system (100) to operate. The HVAC system (100) may be a single system installed at the front or at the back of a motor vehicle. Additionally, the HVAC system (100) may be one system divided between two parts, one located at the front and another one located at the back of the motor vehicle. In one or more embodiments, a system, or sub-system, located at the front of the vehicle may include the same elements mirrored in the back of the vehicle. In one or more embodiments, the motor vehicle may be divided into two areas: an area outside passenger compartments (170, 175) and an area inside passenger compartments (110, 115). Furthermore, the system may include a distribution controller (120, 125), an airflow space (130, 135), a blower motor (140, 145), an evaporator (150, 155), and a heater core (160, 165). Those skilled in the art will appreciate that the configuration of FIG. 1 is not limited to that which is shown, and that one or more of the above-mentioned components may be combined or omitted.

The area outside passenger compartments (170, 175) may be any area that a passenger does not have access to through regular use of the motor vehicle. As such, these areas may include under and above the motor vehicle, under the hood at the front of the motor vehicle, or in the trunk at the back of the motor vehicle. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back.

The area inside passenger compartments (110, 115) may be any area that any passenger has access to at any point through regular use of the motor vehicle. For example, this area may include any area from the dashboard towards the direction of the driver and any area from the back seats towards the front of the car.

The system may include a blower motor (140, 145) hardware configured to produce regulated burst of rotational force to activate subsequent motors or directly impact flow of air in the airflow chamber and the airflow space (130, 135). For example, the blower motor (140, 145) may be considered a device for enabling a fan to push hot/cold air in/out of the area inside passenger compartments (110, 115).

The airflow space (130, 135) may be hardware configured for transporting airflow inside/outside the motor vehicle. In the HVAC system (100), these components may circulate air in/out of the motor vehicle while avoiding impacting shifting in weights. For example, the airflow space (130, 135) may be coupled to the evaporator (150, 155) and the heater core (160, 165) for moving an airflow through the motor vehicle.

The evaporator (150, 155) and the heater core (160, 165) may be one or more elements of an electric radiator that exchanges heat with at least one fluid to change a temperature level in the distributed airflow.

The distribution controller (120, 125) may be a processor or a human-machine interface though which the blower motor (140, 145) is controlled. The distribution controller (120, 125) may be a processor coupled with motors connected to vents for distributing airflow in the motor vehicle. Further, the distribution controller (120, 125) may control and regulate the use of the evaporator (150, 155) and the heater core (160, 165).

The HVAC system (100) may be assembled in at least two distinct sub-assemblies. As such, the above-referenced elements of the HVAC system (100) may be distributed in one or both of the sub-assemblies. For example, in one or more embodiments, the evaporator (150, 155) and the blower motor (140, 145) may be part of a first subassembly of the HVAC system (100), located outside of the passenger compartment of the motor vehicle, while the heater core (160, 165) and the distribution controller (120, 125) may be part of a second subassembly of the HVAC system, located inside the passenger compartment of the motor vehicle. Those skilled in the art will appreciate that embodiments disclosed herein are not limited to the aforementioned example of distribution of elements across sub-assemblies and that these elements may be located in either subassembly without departing from embodiments disclosed herein. The sub-assemblies and their respective assembling process are described in more detail in FIGS. 3-11 below.

The area outside of the passenger compartment and the area inside the passenger compartment may be split by a wall (not shown). The wall may be, in one or more embodiments, a metal sheet associated with the dashboard (not shown in FIG. 1) of the motor vehicle.

Figure 2:
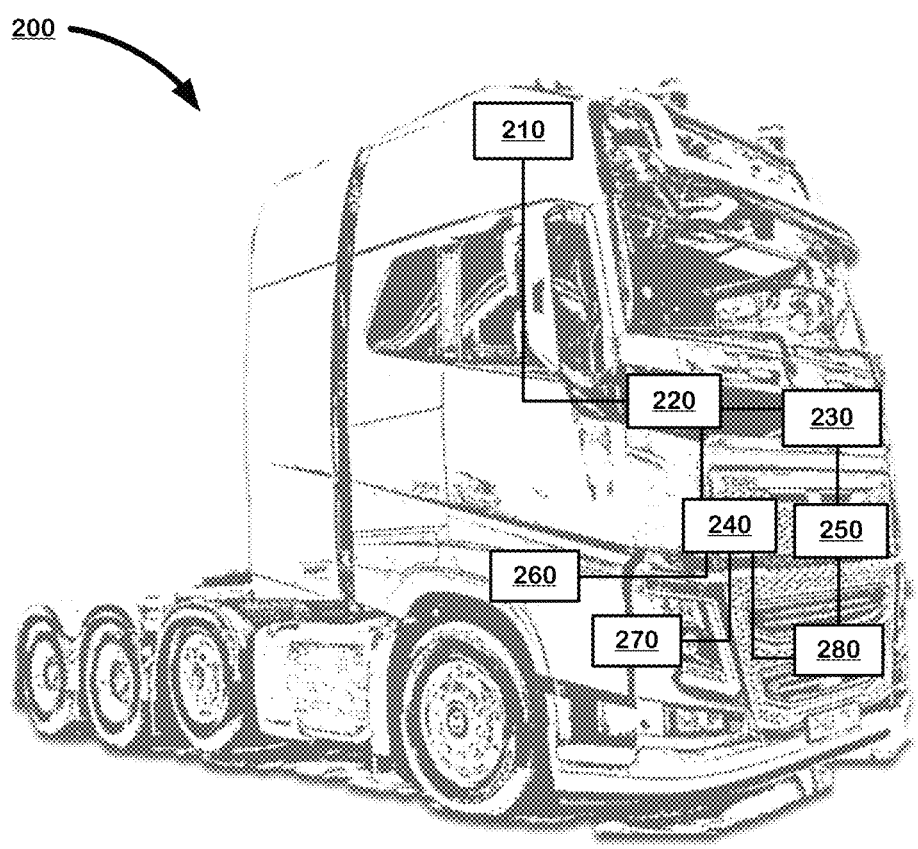
FIG. 2 shows a block diagram of an automotive system in accordance with one or more embodiments.

Turning to FIG. 2, FIG. 2 shows a block diagram of an automotive system in accordance with one or more embodiments. FIG. 2 shows an extended HVAC system (200) for a heavy motor vehicle according to one or more embodiments having various equipment that is powered during regular operation of the heavy motor vehicle. The extended HVAC system (200) may be one system divided between two parts, one located at the front and another one located at the back of the heavy motor vehicle, or one located at the top and another one located at the bottom of the heavy motor vehicle. In one or more embodiments, a system, or sub-system, located at the front of the vehicle may include the same elements mirrored in the back of the heavy motor vehicle. In one or more embodiments, the heavy motor vehicle is a truck and may include one or more sensing elements (210, 230, 250), a distribution controller (220), a blower motor (240), an evaporator (260), a heater core (270), and an airflow space (280).

The system may include one or more sensing elements (210, 230, 250), which may be hardware configured to evaluate surrounding areas inside/outside the heavy motor vehicle and provide feedback relating to physical phenomena. In one or more embodiments, the one or more sensing elements (210, 230, 250) may be a first sensing element (210), a second sensing element (230), and a third sensing element (250). The one or more sensing elements (210, 230, 250) may operate individually or in cooperation with one another to provide a distribution controller (220) with information relating to the physical phenomena. The one or more sensing elements (210, 230, 250) may be hardware sensors for sensing/measuring the vehicle environment, such as object detection sensors, temperature sensors, distance sensors, etc. For example, the one or more sensing elements (210, 230, 250) may aid in a self-driving operation of the heavy motor vehicle. In one or more embodiments, the one or more sensing elements (210, 230, 250) may provide a driver with visual/audio signals relating to the surrounding areas of the heavy motor vehicle. Furthermore, the one or more sensing elements (210, 230, 250) may be part of an autonomous operating system that determines various temperature values for the inside of the cabin in the heavy motor vehicle.

The distribution controller (220) may be a processor or a human-machine interface though which the blower motor (240) and the one or more sensing elements (210, 230, 250) are controlled. The distribution controller (220) may be a processor coupled with motors connected to vents for distributing airflow in the heavy motor vehicle. Further, the distribution controller (220) may control and regulate the use of the evaporator (260) and the heater core (270).

The blower motor (240) may be hardware configured to produce regulated burst of rotational force to activate subsequent motors or directly impact flow of air in the airflow chamber and the airflow space (280). For example, the blower motor (240) may be considered a device for enabling a fan to push hot/cold air in/out of the area inside a passenger compartment.

The evaporator (260) and the heater core (270) may be one or more elements of an electric radiator that exchanges heat with at least one fluid to change a temperature level in the distributed airflow. In one or more embodiments, the evaporator (260) and the heater core (270) may be assembled during a manufacturing process and the evaporator (260) and the heater core (270) may be afterwards installed within the heavy motor vehicle as part of the extended HVAC system (200). In one or more embodiments, the evaporator (260) and/or the heater core (270) may be serviced through the passenger compartment and without uninstalling any other parts of the extended HVAC system (200).

The airflow space (280) may be hardware configured for transporting airflow inside/outside the heavy motor vehicle. In the extended HVAC system (200), this component may circulate air in/out of the motor vehicle while avoiding impacting shifting in weights. For example, the airflow space (280) may be coupled to the evaporator (260) and the heater core (270) for moving an airflow through the motor vehicle.

The extended HVAC system (200) may be assembled in at least two distinct sub-assemblies. As such, the above-referenced elements of the extended HVAC system (200) may be distributed in one or both of the sub-assemblies. For example, in one or more embodiments, the evaporator (260) and the blower motor (240) may be part of a first subassembly of the extended HVAC system (200), located outside of the passenger compartment of the motor vehicle, while the heater core (270) and the distribution controller (220) may be part of a second subassembly of the HVAC system, located inside the passenger compartment of the motor vehicle. Those skilled in the art will appreciate that embodiments disclosed herein are not limited to the aforementioned example of distribution of elements across sub-assemblies and that these elements may be located in either subassembly without departing from embodiments disclosed herein. The sub-assemblies and their respective assembling process are described in more detail in FIGS. 3-11 below.

Figure 3:
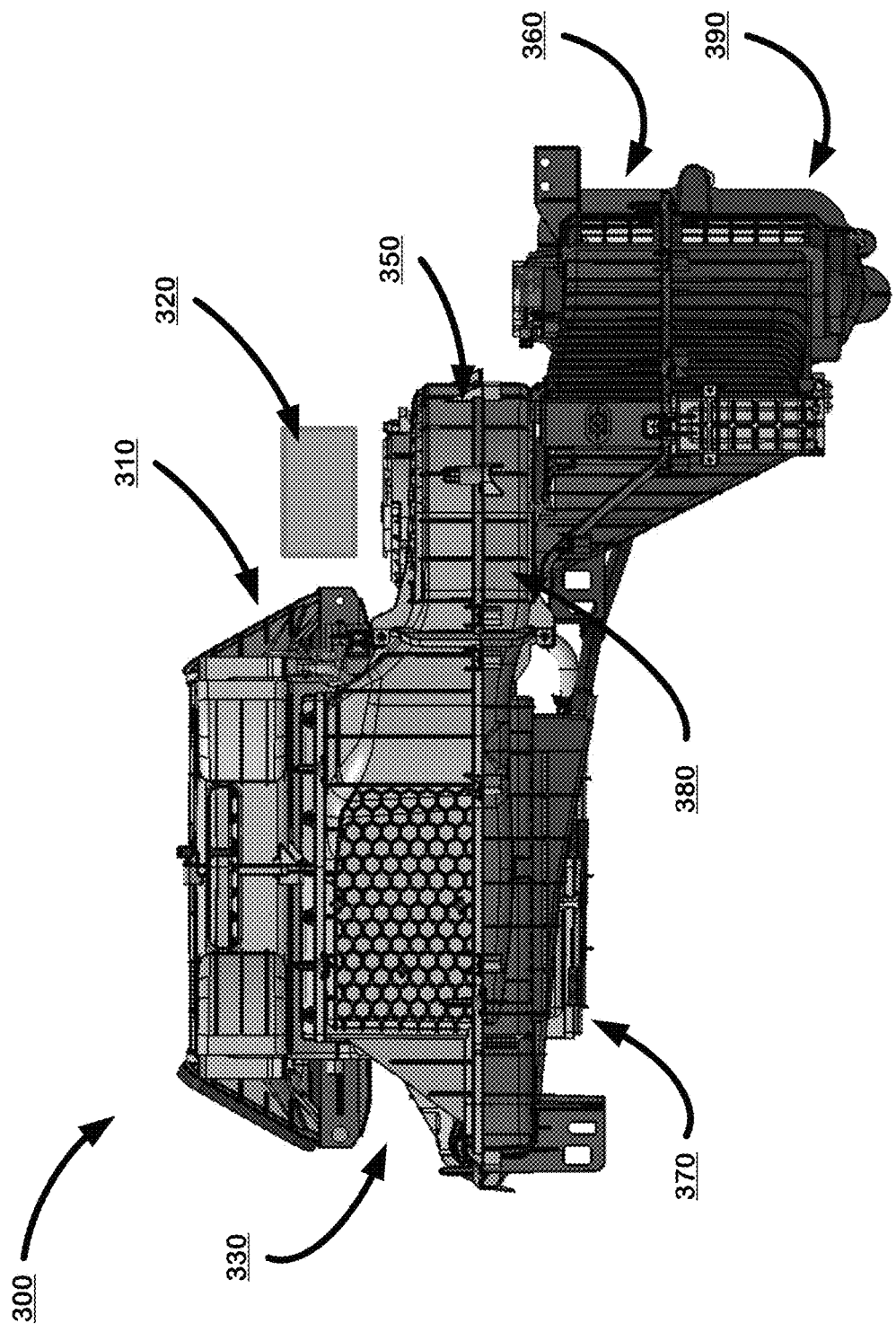
FIG. 3 shows an example of a blower motor installed in an HVAC assembly in accordance with one or more embodiments.

Turning to FIG. 3, FIG. 3 shows a front view of an HVAC assembly in accordance with one or more embodiments. As shown in FIG. 3, the HVAC assembly (300) may be a combination of at least two subassemblies assembled in a direction of insertion within a motor vehicle. The HVAC assembly (300) may include an air distribution assembly (310) that may be coupled to an evaporator (330) and a heater core (370) in one direction. The HVAC assembly (300) may include a blower motor (350) in a scroll housing subassembly (380) at a blower motor location (380) that may be coupled to an air distribution inlet (360) in an air inlet assembly (390). The blower motor location (380) may be disposed directly in front of an obstruction (320) in a specific direction. The distance between the obstruction (320) and the location of the blower motor (380) may be 0 millimeters and the distance between the obstruction (320) and the blower motor (350) may be 10 millimeters or less.

At an installed position, the blower motor (350) may be attached to a scroll housing subassembly (380) that connects the air inlet assembly (390) and the air distribution assembly (310). The scroll housing subassembly (380) may include elements that secure the scroll housing subassembly (380) to either the air inlet assembly (390) or the air distribution assembly (310). As such, the blower motor (350) may not rattle or move in any direction when installed in the HVAC assembly (300).

It may not be needed to dismantle or uninstall the HVAC assembly (300) once it has been installed through a manufacturing process or an assembling process. As such, the blower motor (350) may be permitted to be serviced along with the scroll housing subassembly (380) in only one direction after the HVAC assembly (300) has been installed. In one or more embodiments, this direction of the scroll housing subassembly (380) servicing may be a direction of extraction which may provide the scroll housing subassembly (380) with sufficient space to be detached from the air inlet assembly (390) and the air distribution subassembly (310). At this point, the scroll housing subassembly (380) may be removed from the HVAC assembly (300) without having to dismantle, or remove, other parts of the HVAC assembly (300) unnecessarily. Thus, parts that are unnecessary to be removed for the scroll housing subassembly (380) servicing may be parts of the HVAC assembly (300) or sub-assemblies that may directly hold the scroll housing subassembly (380) installed inside the HVAC assembly (300). As such, unnecessary parts may include any of the elements or sub-assemblies discussed herein as long as these components are not the scroll housing subassembly (380). For example, in one or more embodiments, only portions of latches, locking mechanisms, or clamps keeping the scroll housing subassembly (380) in the HVAC assembly (300) that are installed onto the scroll housing subassembly (380) may be removed when servicing the scroll housing subassembly (380). Other subassemblies, such as the evaporator subassembly, the air inlet subassembly, etc., may remain intact as part of the HVAC assembly even while servicing the scroll housing subassembly (380). As such, the obstacle (320) may not need to be damaged or be removed from the motor vehicle during servicing of the motor blower (350).

In one or more embodiments, the direction of extraction may be a direction towards a cabin or a passenger compartment, also known as an "X" direction. The direction of extraction may be orthogonal to a direction of insertion of the scroll housing subassembly (380) into the HVAC assembly (300). For example, during a manufacturing/assembling process, the HVAC assembly (300) may include assembling the scroll housing subassembly (380) in a direction of insertion along the Z-axis at a manufacturing/assembling location (as seen from the front view in FIG. 3).

In one or more embodiments, the blower motor (350) may be attached to the scroll housing subassembly (380) through a scroll assembly. The blower motor (350) may include screws to secure the blower motor (350) onto the scroll assembly. Thus allowing the scroll housing subassembly (380) to be serviced as one subassembly. For example, the scroll housing subassembly (380) may be extracted from the HVAC assembly (300) and the blower motor (350) may be further extracted from the scroll housing subassembly (380) once the scroll housing subassembly (380) has been extracted from the HVAC assembly (300).

The scroll housing subassembly (380) may include securing elements that are only engaged by rotating, or twisting, the scroll housing subassembly (380) in the Z-direction into the HVAC assembly (300). During installation at the manufacturing/assembling location, the obstacle (320) may be present and the direction of insertion into the HVAC assembly (300) may be the same as the direction of extraction. Furthermore, the direction of extraction may be parallel to the direction of insertion after servicing of the scroll housing subassembly (380) may be completed. At this point, the scroll housing subassembly (380) may be further configured for allowing movement along the direction of insertion, along the Z-axis, for removing of the scroll housing subassembly (380) in the direction of extraction, along the X-axis.

The blower motor and scroll housing subassembly being removed as one subassembly greatly reduces the area needed for part serviceability. As instrument panel space becomes more limited, the blower motor assembly is moving further into the instrument panel, reducing accessibility. By using a combination of twist lock features and a creative arcing tongue and groove design, the scroll housing subassembly is removable with <10 millimeters of axial movement. This method of serviceability also allows for the protection of the motor/wheel assembly balance when installing. The scroll acts to protect the wheel from contact with other components and potential balance clip displacement.

Figure 4:
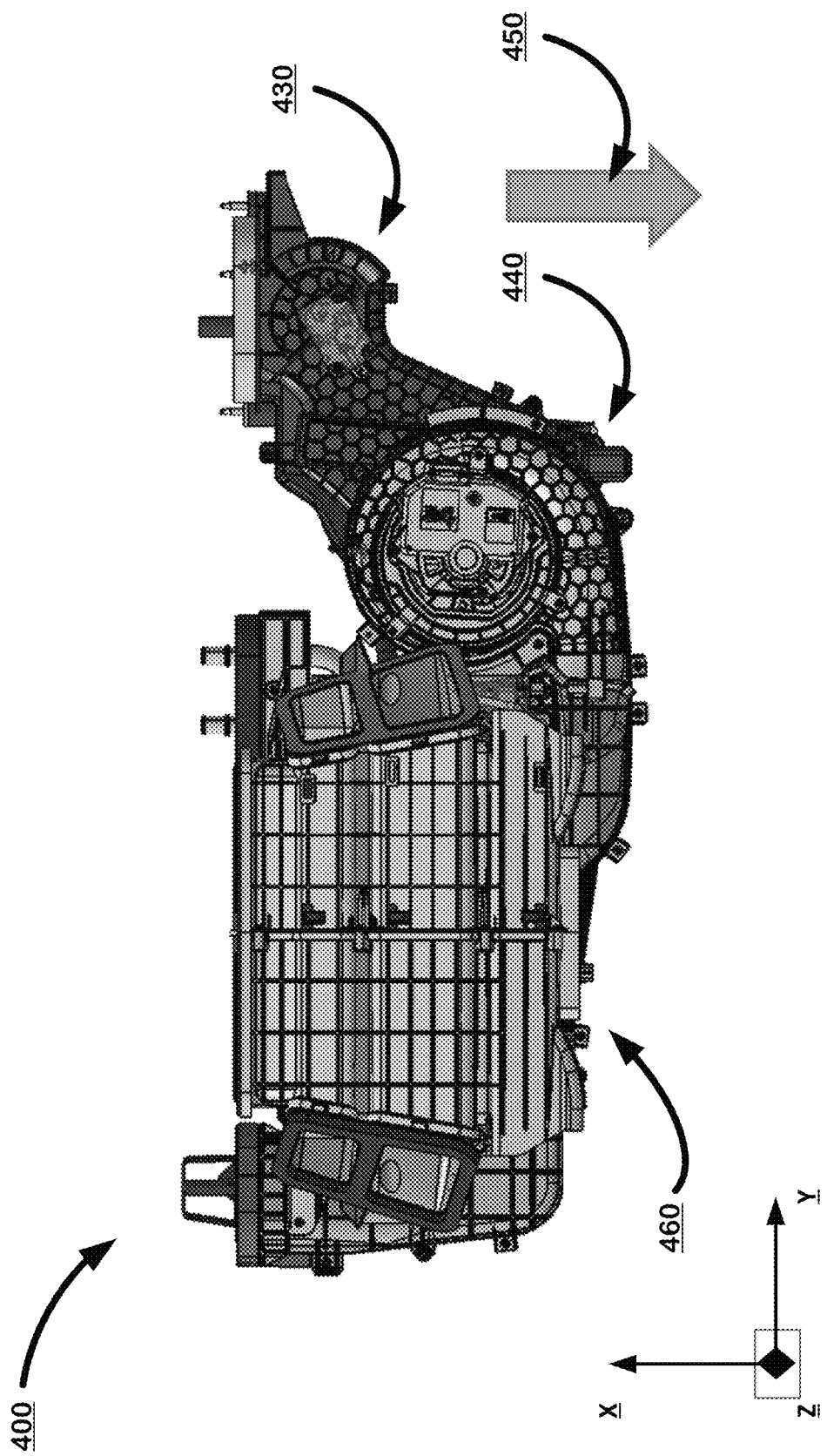
FIG. 4 shows an example of a blower motor installed in an HVAC assembly in accordance with one or more embodiments.

Turning to FIG. 4, FIG. 4 shows a plan view of an assembly in accordance with one or more embodiments. As shown in FIG. 4, an HVAC housing assembly (400) may include three distinct housing subassemblies. These housing assemblies may include an air inlet housing subassembly (430), a scroll housing subassembly (440) and an evaporator housing subassembly (460). Air vents and an airflow space may comprise the air inlet housing subassembly (430). The scroll housing subassembly (440) may include a blower motor and a scroll assembly. A heater core and/or an evaporator may be embedded or installed within the evaporator housing subassembly (460). As such, when servicing the blower motor, the blower motor may be configured for removal and servicing along with the scroll housing subassembly (440), to which the blower motor is attached, in a specific direction.

In one or more embodiments, the blower motor location (440) of the blower motor inside the scroll housing subassembly (440) cannot be reached in an direction of insertion along a Z-axis. Similarly, in one or more embodiments, the scroll housing subassembly (440) including the blower motor cannot be serviced in a direction along a Y-axis. As such, the scroll housing subassembly (440) may be removed and serviced in a direction of extraction (450) along an X-axis. In one or more embodiments, a direction of extraction (450) and a direction of removal are the same direction. The direction of extraction (450) may be a direction that permits removal of the scroll housing subassembly (440) from the HVAC housing assembly (400), while an axial direction resulting for rotating, or twisting, of the scroll housing subassembly (440) may be a direction orthogonal to the direction of extraction (450) in which the scroll housing subassembly (440) disengages from the HVAC housing assembly (400) or the air inlet housing subassembly (430) or the evaporator housing subassembly (460). As such, for removal of the scroll housing subassembly (440) without dismantling of any other subassemblies of the HVAC, the scroll housing subassembly (440) may rotate axially in a Z-direction up to a height needed for extraction, and then the scroll housing subassembly (440) may move in an X-direction towards the direction of extraction (450). The direction of extraction (450) may be the direction of servicing the scroll housing subassembly (440).

In one or more embodiments, the scroll housing subassembly (440) is locked to one or more housing subassemblies adjacent to the motor blower location (440). In one or more embodiments, the scroll housing subassembly (440) may be secured to the surrounding housing subassemblies and into the HVAC housing assembly without using any screws. That is, while the scroll housing subassembly (440) may be firmly attached to one or more housing subassemblies using one or more securing elements, the scroll housing subassembly (440) does not need to use any connector components (i.e., nails, screws, etc) in engaging other housing subassemblies.

Figure 5:
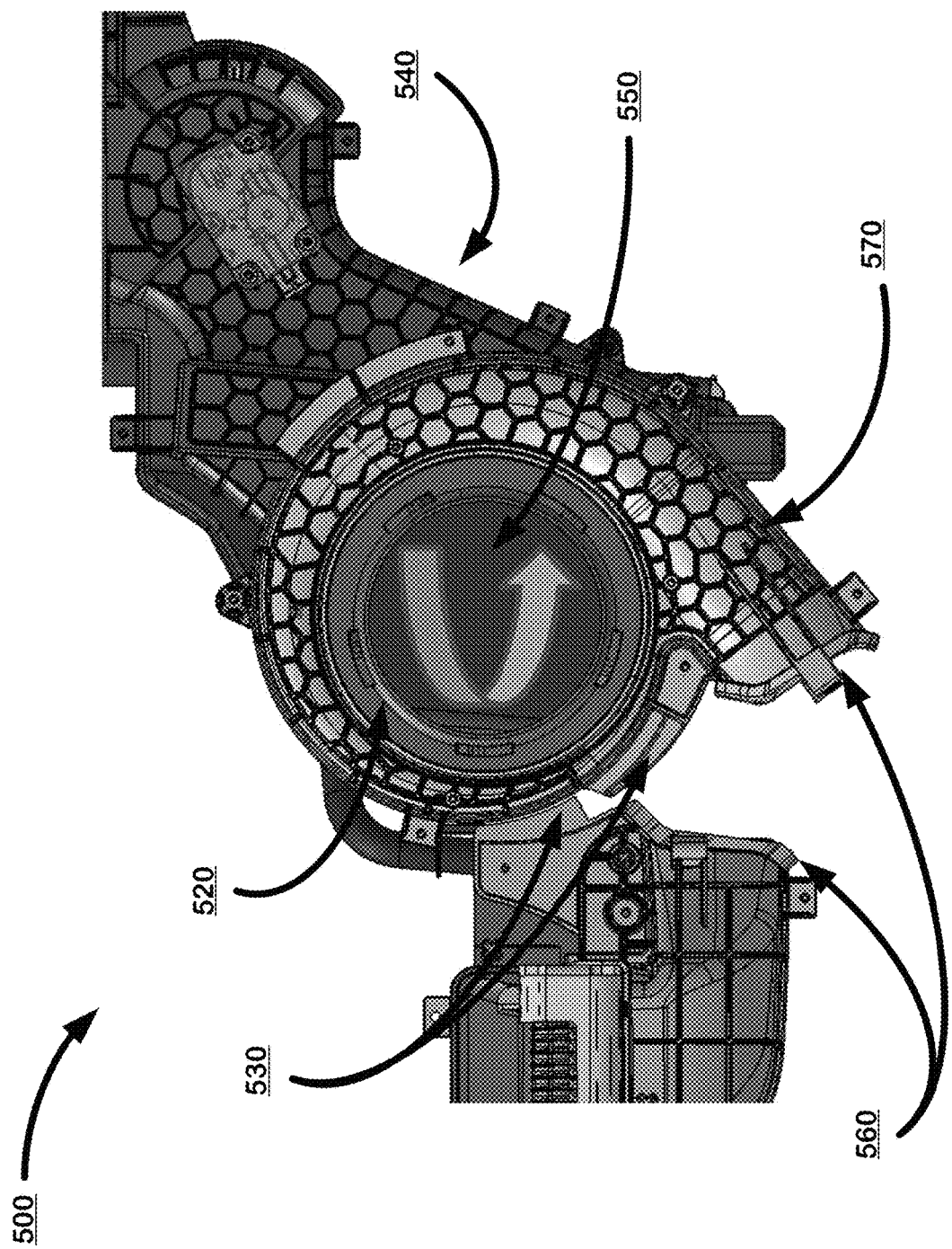
FIG. 5 shows an example of a blower motor installed in an HVAC assembly in accordance with one or more embodiments.

Turning to FIG. 5, FIG. 5 shows a close-up view of an assembly in accordance with one or more embodiments. As shown in FIG. 5, an area (500) surrounding the scroll housing subassembly (570) may be blocked off. For example, considering FIG. 5 as a close-up view of the HVAC assembly in FIG. 4, FIG. 5 shows that the area (500) is blocked off and prevents servicing of the scroll housing subassembly (570) in a direction along the Y-axis. In one or more embodiments, the blocked off area is all around the immediate proximity of the scroll housing subassembly (570). The scroll housing subassembly (570) may be configured for a rotational movement (550) on an axis centered at a central location (520). This configuration may provide a twisting effect and movement that engages or disengages an air inlet housing subassembly (540) and an evaporator housing subassembly. Disengaging the housing subassemblies adjacent to the scroll housing subassembly (570) may occur while the rotational movement (550) is ongoing or it may occur after the rotational movement (550) is completed.

In one or more embodiments, there are one or more securing elements (530, 560) that attach the scroll housing subassembly (570) to any adjacent housing subassemblies. The securing elements (530, 560) may be distributed on both the scroll housing subassembly (570) and one or more of the adjacent housing subassemblies. The securing elements (530, 560) may be disengaged upon start of the rotational movement (550), during the rotational movement (550) or after the rotational movement (550) is completed.

In one or more embodiments, the rotational movement (550) may be performed in a counter-clockwise direction (as shown in FIG. 5) or a clockwise direction. The counter-clockwise movement may move the scroll housing subassembly (570) closer in a direction of view while the clockwise movement may move the scroll housing subassembly (570) away in a direction of view.

In one or more embodiments, a first securing element (560) may be a arcing tongue and groove combination distributed between the scroll housing subassembly (570) and the evaporator housing subassembly. The first securing element (560) may have a contact surface proportional to a radial length of 40 degrees or less. The first securing element (560) may be distributed so that an arcing groove may be disposed on the evaporator housing subassembly and so that an arcing tongue is disposed on the scroll housing subassembly (570). In one or more embodiments, the first securing element (560) may be fully disengaged immediately after the scroll housing subassembly (570) starts following the rotational movement (550), at which point the scroll housing subassembly (570) may not have reached an extraction height. The same configurations and in opposite behavior may be applied to the scroll housing subassembly (570) in the process of installing and engaging the scroll housing subassembly (570) with the adjacent subassemblies.

In one or more embodiments, a second securing element (530) may be a radially disposed male-female wedge combination distributed between the scroll housing subassembly (570) and the evaporator housing subassembly. The second securing element (530) may have a radial length of 40 degrees or less. The second securing element (530) may be distributed so that a radial female wedge may be disposed on the evaporator housing subassembly and a corresponding radial male wedge may be disposed on the scroll housing subassembly (570). In one or more embodiments, the second securing element (530) may be fully disengaged after the scroll housing subassembly (570) has been fully rotated following the rotational movement (550), at which point the scroll housing subassembly (570) may have reached an extraction height. The same configurations but in opposite directions may be applied to the scroll housing subassembly (570) in the process of installing and engaging the scroll housing subassembly (570) with one or more adjacent subassemblies.

Figure 6:
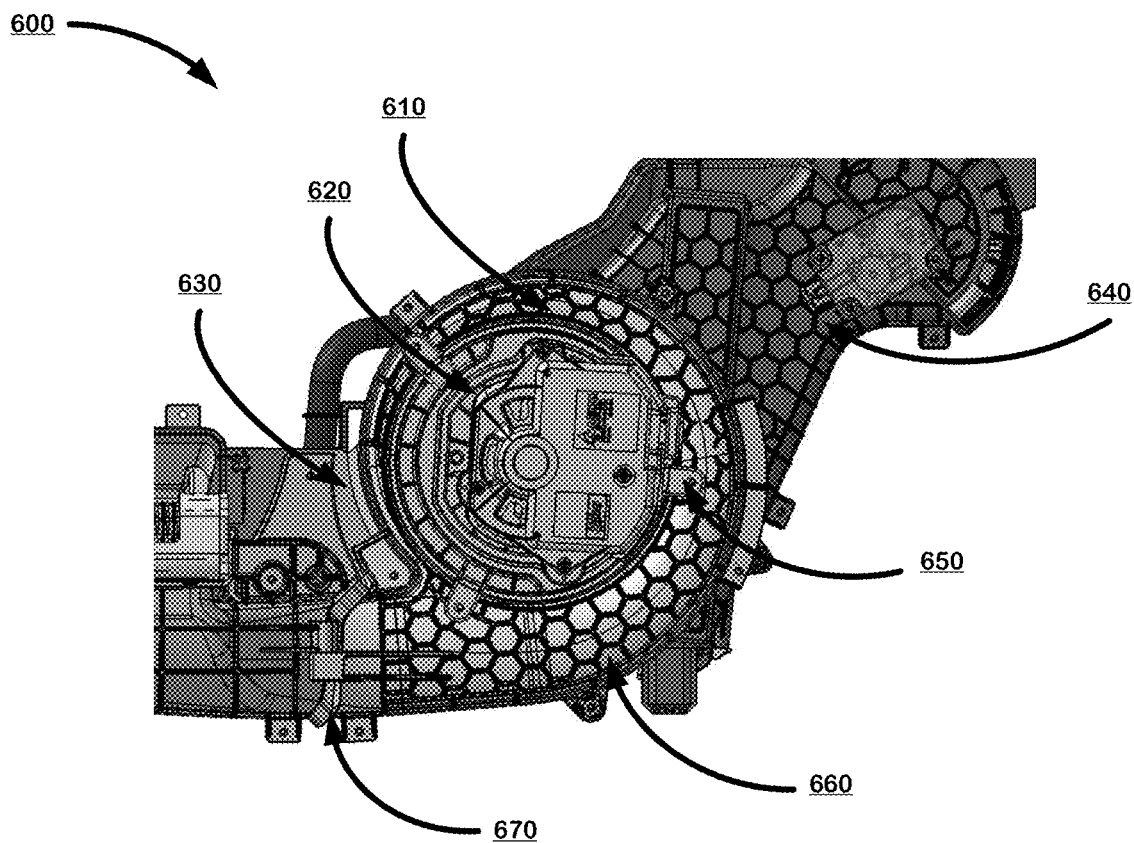
FIG. 6 shows an example of a scroll housing subassembly servicing configuration in accordance with one or more embodiments.

Turning to FIG. 6, FIG. 6 provides an example of a scroll housing subassembly servicing configuration. The following example is for explanatory purposes and not intended to limit the scope of the disclosed technology. Turning to FIG. 6, an area (600) of the plan view of an HVAC housing assembly (610) is shown in an installed position. The area (600) includes a first securing element (670), a second securing element (630), at least one fastening element (650), a blower motor (620) attached to a scroll housing subassembly (660) that is adjacent to both an evaporator housing subassembly on one side and an air inlet housing subassembly (640) on the other side.

In one or more embodiments, the installed position of the scroll housing subassembly (660) shows the first securing element (670) and the second securing element (630) being completely engaged and sealing at least two points in the HVAC housing assembly (610). In particular, the first and second securing elements engage the scroll housing subassembly with the evaporator housing subassembly. The male and female wedge are engaged such that the female wedge of the scroll housing subassembly is embedded in the male wedge portion on the evaporator housing subassembly. The tongue and groove securing elements are flush against each other as well. As such, the scroll housing subassembly (660) may be configured for seamless fitting in the HVAC housing assembly (610).

Figure 7:
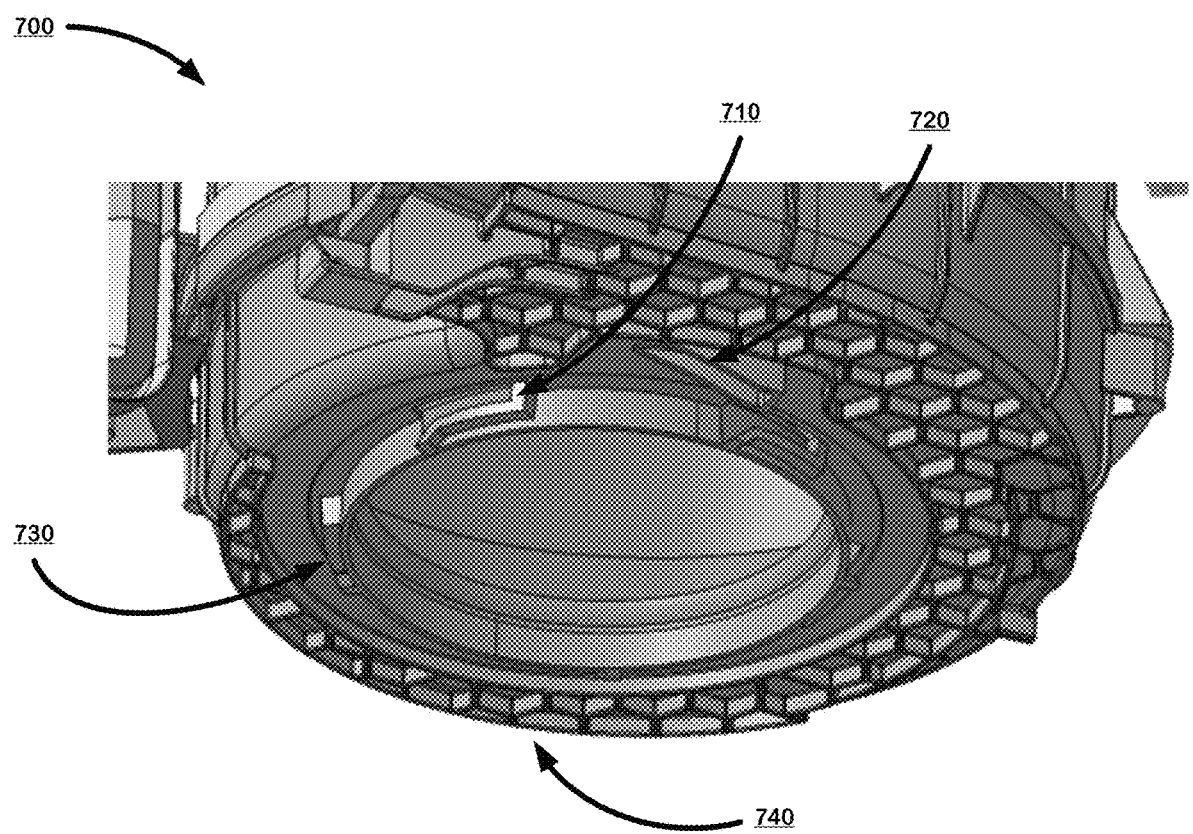
FIG. 7 shows an example of a scroll housing subassembly servicing configuration in accordance with one or more embodiments.

Turning to FIG. 7, FIG. 7 provides an example of a scroll housing subassembly servicing configuration. The following example is for explanatory purposes and not intended to limit the scope of the disclosed technology. The area (700) may include a third securing element (710, 730) distributed around a circumference, or periphery portion (720), of an engaging portion of the scroll housing subassembly (740). The engaging portion of the scroll housing subassembly (740) may be a portion that directly contacts a top or a bottom portion of an adjacent housing subassembly. For example, the engaging portion of the scroll housing subassembly (740) may include the third securing element (710, 730) in addition to the first securing element (560) and the second securing element (530) discussed in FIG. 5. The periphery portion (720) may be any geometric shape.

In one or more embodiments, there are at least two places that include the third securing element (710, 730) in a circumference of the engaging portion of the scroll housing subassembly (740). In one or more embodiments, the third securing element (710, 730) may be bayonet features that interlock corresponding features in an adjacent subassembly with which the third securing element (710, 730) engage to seal the HVAC housing assembly. In alternate embodiments, the third securing element (710, 730) may be reverse bayonet features, pull-push coupling features, or breakaway coupling features. In one or more embodiments, the third securing element (710, 730) may be hardware configured for engaging an inner portion of an adjacent housing subassembly, for example, an air inlet subassembly. In one or more embodiments, the third securing element (710, 730) may be hardware configured for configured for providing a radial movement with respect to the engaging portion of the scroll housing subassembly (740) in a rotational movement that is equal or less than an angle of extraction. In one or more embodiments, the third securing element (710, 730) may be hardware configured for providing an axial movement equal or less than an extraction height.

Figure 8:
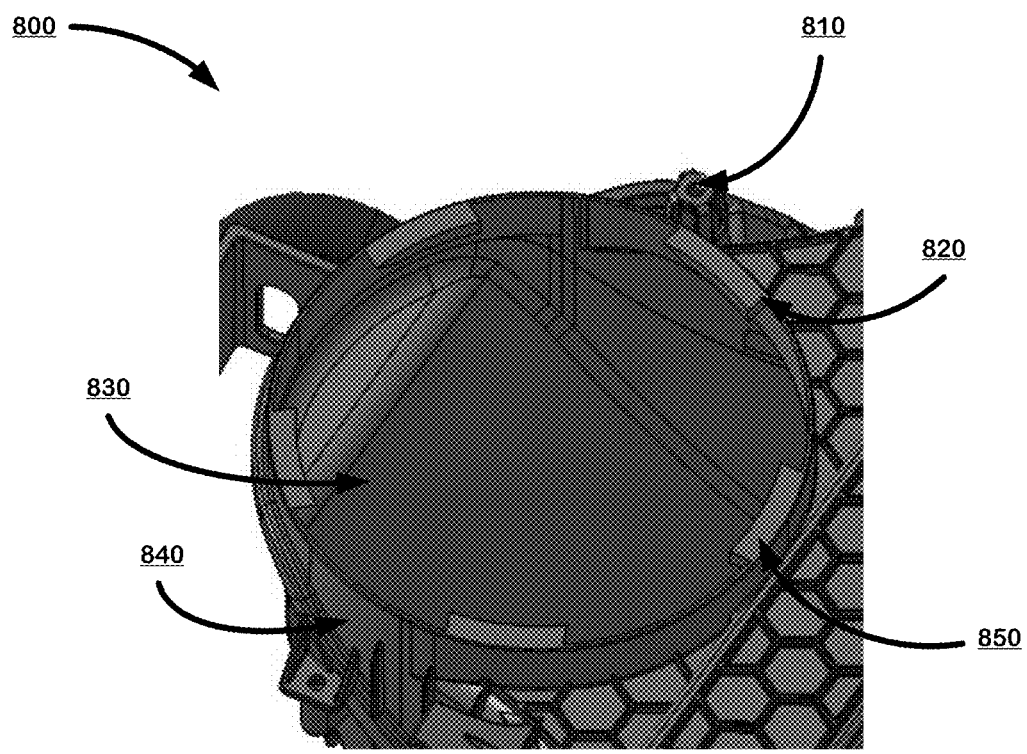
FIG. 8 shows an example of a scroll housing subassembly servicing configuration in accordance with one or more embodiments.

Turning to FIG. 8, FIG. 8 provides an example of a scroll housing subassembly servicing configuration. Specifically, FIG. 8 shows a counterpart subassembly (e.g., the air inlet subassembly) that engages with the third securing elements on the scroll housing subassembly. The following example is for explanatory purposes and not intended to limit the scope of the disclosed technology. The area (800) may include a third securing element (820, 850) distributed around a circumference of an engaging portion of the air inlet housing subassembly (840). The engaging portion of the air inlet housing subassembly (840) may be a portion that directly contacts a top or a bottom portion of the scroll housing subassembly. For example, the engaging portion of the air inlet housing subassembly (840) may include the third securing element (820, 850) that engage the third securing element (710, 730) of FIG. 7. In one or more embodiments, the engaging portion of the air inlet housing subassembly (840) may allow movement of airflow though an airflow space (830) and may be permanently attached to the motor vehicle or a component of the motor vehicle through fastening elements (810).

In one or more embodiments, there are at least two places that include the third securing element (820, 850) in a circumference of the engaging portion of the air inlet housing subassembly (840). The third securing element (820, 850) may be reverse bayonet features that interlock corresponding features in the scroll housing subassembly to which the third securing element (820, 850) engage to seal the HVAC housing assembly. The third securing element (820, 850) may be bayonet features, pull-push coupling features, or breakaway coupling features. In one or more embodiments, the third securing element (820, 850) may be hardware configured for engaging an inner portion of the scroll housing subassembly. In one or more embodiments, the third securing element (820, 850) may be hardware configured for configured for providing a radial movement with respect to the engaging portion of the air inlet housing subassembly (840) in a rotational movement that is equal or less than an angle of extraction. In one or more embodiments, the third securing element (820, 850) may be hardware configured for providing an axial movement equal or less than an extraction height.

Figure 9:
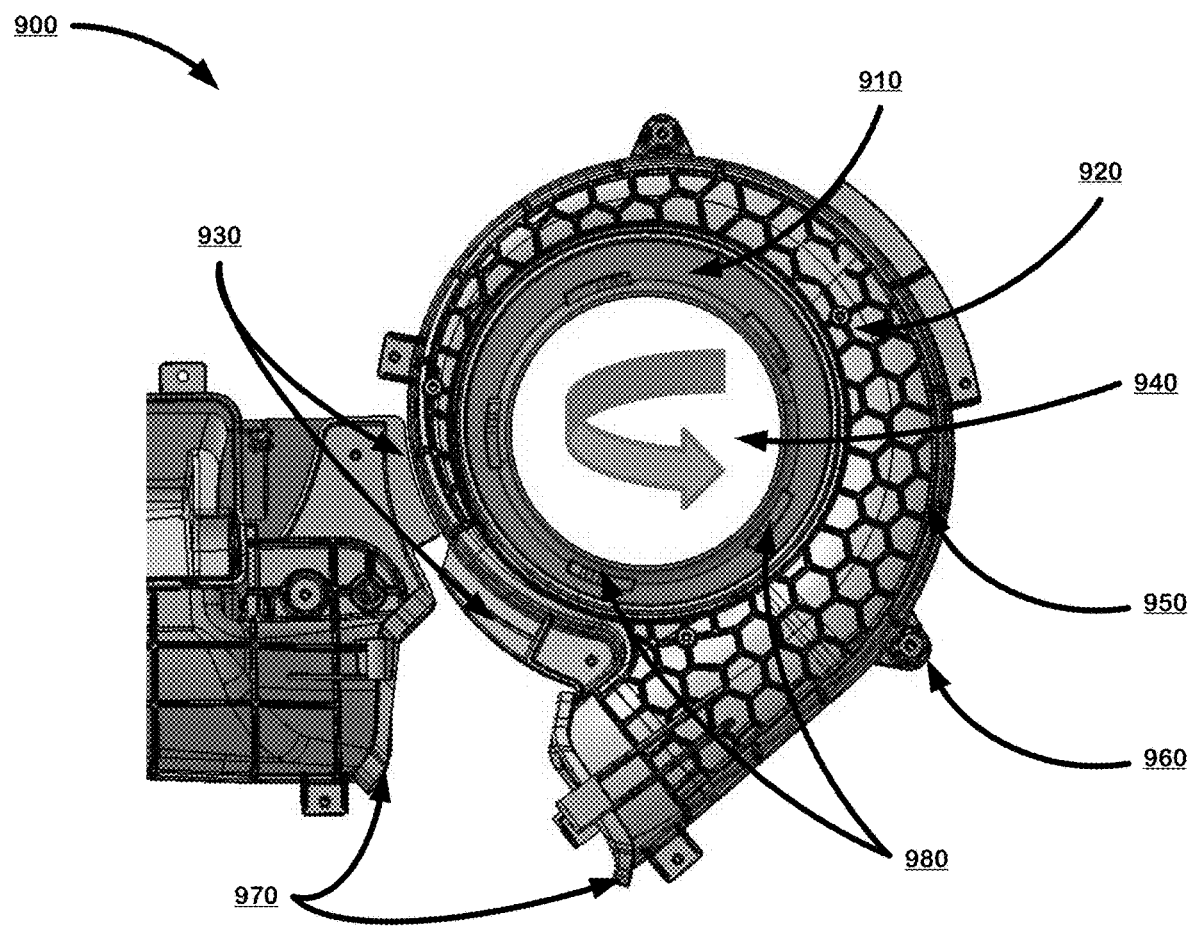
FIG. 9 shows an example of a scroll housing subassembly servicing configuration in accordance with one or more embodiments.

FIG. 9 provides an example of a scroll housing subassembly servicing configuration. The following example is for explanatory purposes and not intended to limit the scope of the disclosed technology. Turning to FIG. 9, shows that the area (900) is blocked off and prevents servicing of the scroll housing subassembly (950) in a direction along the Y-axis. In one or more embodiments, the blocked off area may surround the immediate proximity of the scroll housing subassembly (950). The scroll housing subassembly (950) may be configured for a rotational movement (940) on an axis centered at a central location (910). This configuration may provide a twisting effect and movement that engages or disengages an air inlet housing subassembly and an evaporator housing subassembly, as shown in FIG. 5. Disengaging the housing subassemblies adjacent to the scroll housing subassembly (950) may occur while the rotational movement (940) is ongoing or it may occur after the rotational movement (940) is completed.

In one or more embodiments, the scroll housing subassembly (950) may include a scrolling housing (960) with perforations (920) to allow a blower motor to be fastened in place while inserted into the central location (910). As such, the scroll housing subassembly (950) is configured for simultaneous extraction of the blower motor and the scrolling housing (960).

In one or more embodiments, there are one or more securing elements (930, 970, 980) that attach the scroll housing subassembly (950) to any adjacent housing subassemblies. The securing elements (930, 970, 980) may be distributed on both the scroll housing subassembly (570) and one or more of the adjacent housing subassemblies. The securing elements (930, 970, 980) may be disengages upon start of the rotational movement (940), during the rotational movement (940), during the rotational movement (940) or after the rotational movement (940) is completed.

In one or more embodiments, the rotational movement (940) may be performed in a counter-clockwise direction (as shown in FIG. 9) or in a clockwise direction. The counter-clockwise movement may move the scroll housing subassembly (940) closer in a direction of view while the clockwise movement may move the scroll housing subassembly (940) away in a direction of view.

In one or more embodiments, a first securing element (970) may be the first securing element (560) described in FIG. 5. In one or more embodiments, a second securing element (930) may be the second securing element (530) described in FIG. 5. In one or more embodiments, a third securing element (980) may be the third securing element (710, 730) described in FIG. 7.

Figure 10:
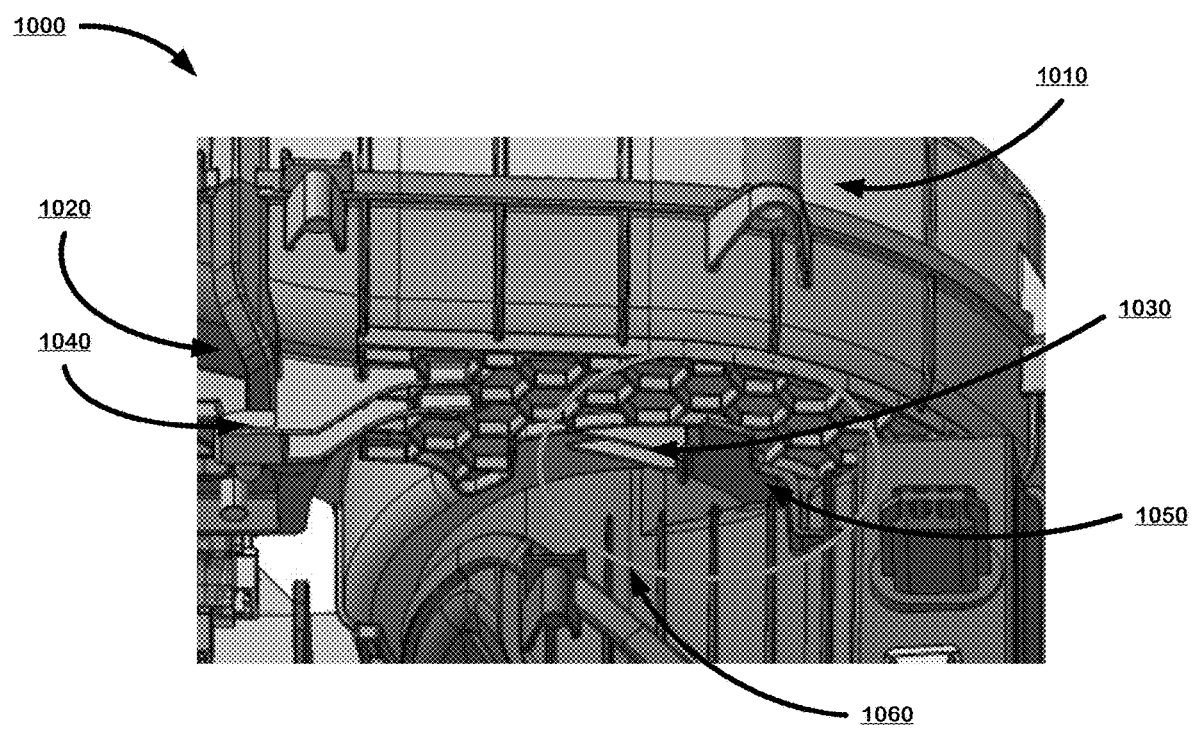
FIG. 10 shows an example of a scroll housing subassembly servicing configuration in accordance with one or more embodiments.

FIG. 10 provides an example of a scroll housing subassembly servicing configuration. The following example is for explanatory purposes and not intended to limit the scope of the disclosed technology. Turning to FIG. 10, the area (1000) may be the area (700) of FIG. 7 and includes a close up view of a safety mechanism (1050) arranged onto the air inlet housing subassembly (1060) and the scroll housing subassembly (1010). In one or more embodiments, the safety mechanism (1050) attaches the air inlet housing subassembly (1060) to the scroll housing subassembly (1010) through a receiving protrusion (1030) or a tab, which allows the scroll housing subassembly to remain intact during transit by locking the scroll housing subassembly in place. Disengagement is facilitated by pushing down on the safety mechanism (1050).

In one or more embodiments, the area (1000) provides a connecting portion in which the scroll housing subassembly (1010) engages the evaporator housing subassembly (1020). As such a second securing element (1040) may be the second securing element (530) described in FIG. 5.

Figure 11:
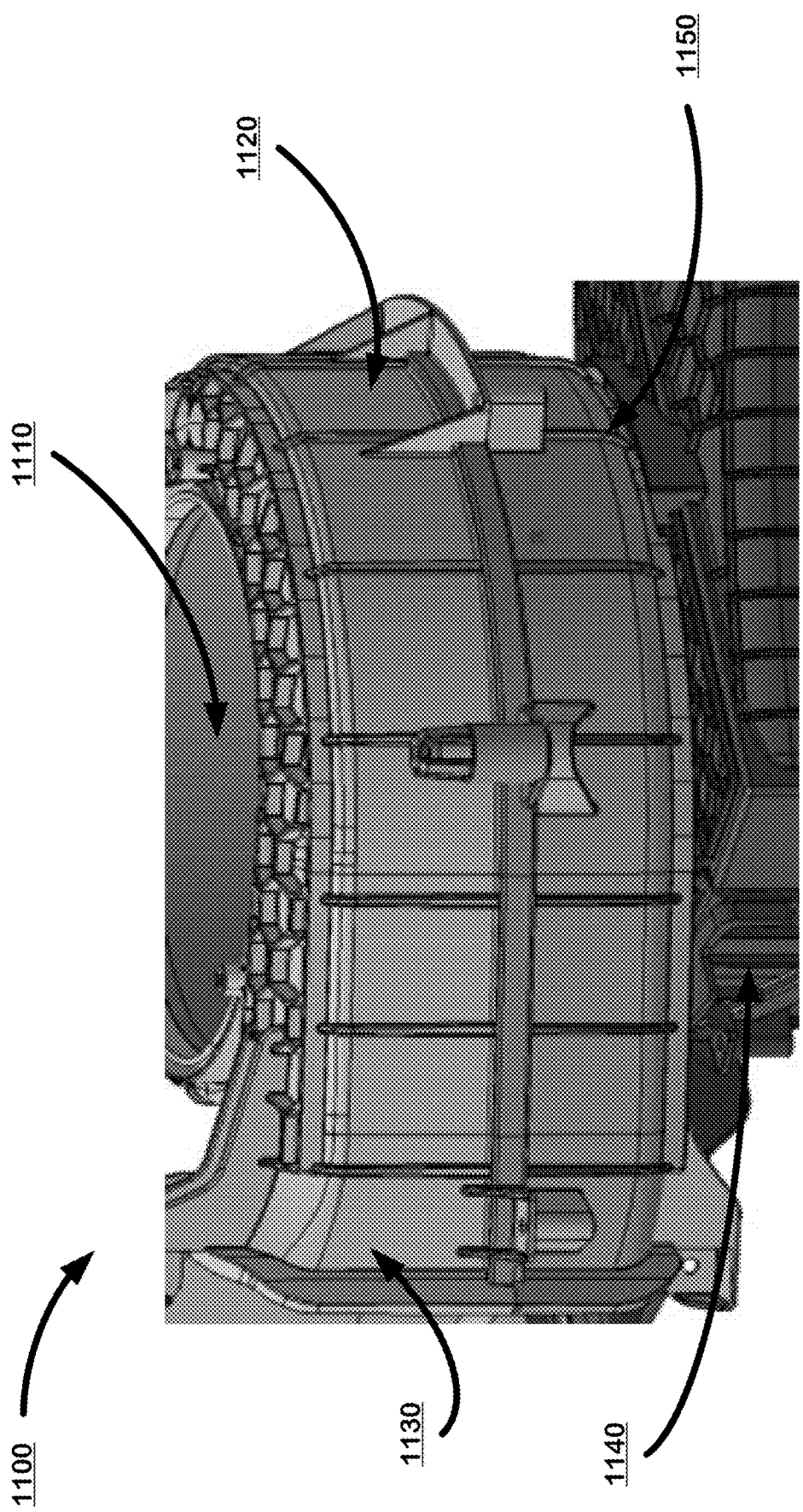
FIG. 11 shows an example of a scroll housing subassembly servicing configuration in accordance with one or more embodiments.

FIG. 11 provides an example of a scroll housing subassembly servicing configuration. The following example is for explanatory purposes and not intended to limit the scope of the disclosed technology. Turning to FIG. 11, a servicing area (1100) may include the scroll housing subassembly (1120) in a view (1110) facing from the direction of extraction. In this example, the scroll housing subassembly (1120) may be installed by engaging with the evaporator housing subassembly (1130) and engaging with the air inlet housing subassembly (1140).

In one or more embodiments, in the view (1110), a reference point (1150) may be identified in the scroll housing subassembly (1120). The reference point (1150) is an indicator of a location to start rotating the scroll housing subassembly from the installed position. The reference point (1150) may be hardware, such as a pin or a protrusion, configured for indicating a location to stop rotating the scroll housing subassembly into the installed position.

Figure 12:
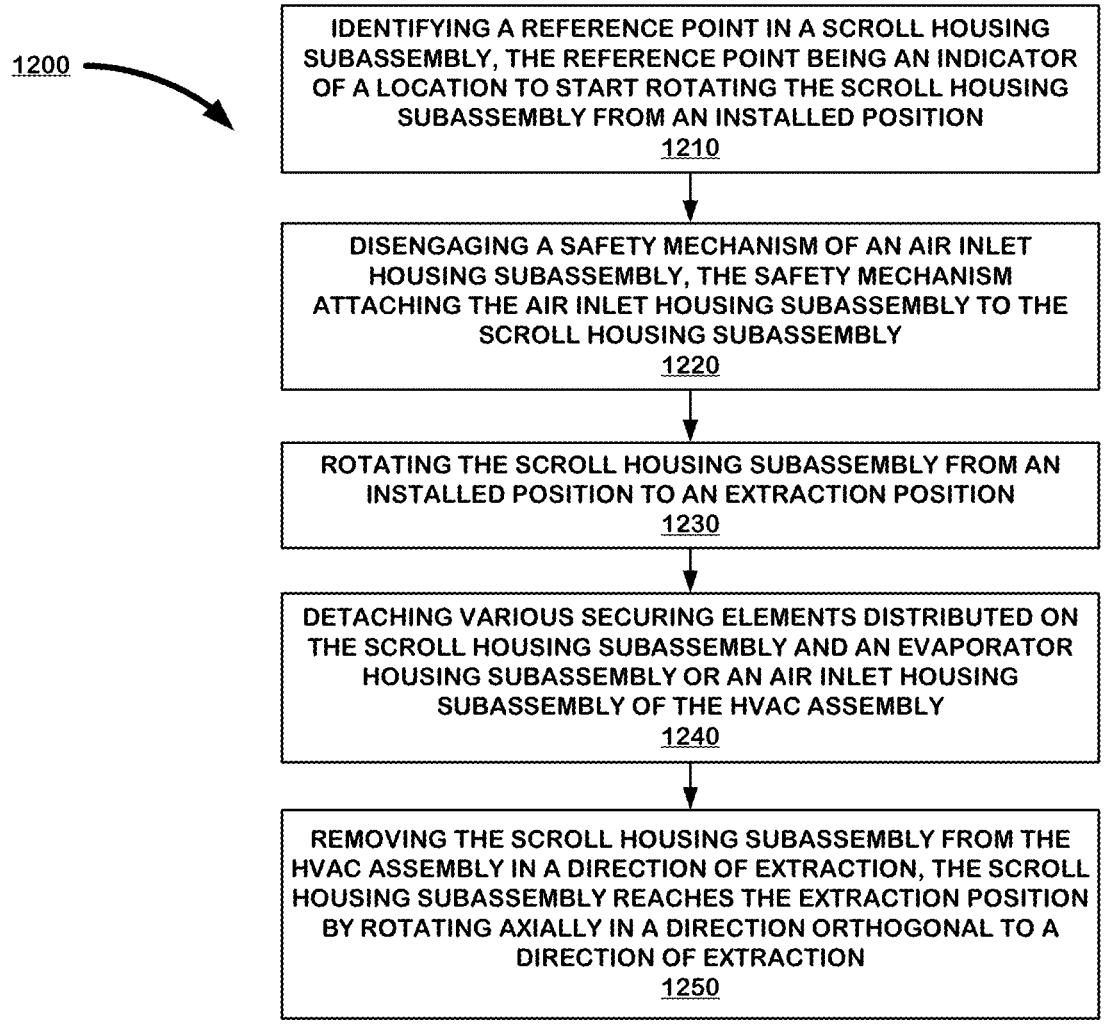
FIG. 12 shows a flowchart describing a process for servicing a scroll housing subassembly installed in an HVAC in accordance with one or more embodiments.

Turning to FIG. 12, FIG. 12 shows a flowchart in accordance with one or more embodiments. Specifically, FIG. 12 describes a method for servicing a scroll housing subassembly installed in an HVAC assembly for a motor vehicle. One or more blocks in FIG. 1 or 2 may be performed by one or more components as described above in FIGS. 3-11. While the various blocks in FIG. 12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 1210, a reference point in a scroll housing subassembly may be identified, the reference point being an indicator of a location to start rotating the scroll housing subassembly from an installed position. For example, a mechanic servicing the scroll housing subassembly may refer to the reference point to identify a starting point in which to rotate the scroll housing subassembly for removal in an axial direction.

In step 1220, a safety mechanism of an air inlet housing subassembly may be disengaged, the safety mechanism attaching the air inlet housing subassembly to the scroll housing subassembly. For example, the air inlet housing subassembly may include the safety mechanism to maintain the scroll housing subassembly in further lock with respect to the HVAC assembly. As such, disengaging the safety mechanism may be needed to start rotation of the scroll housing subassembly. Furthermore, the scroll housing subassembly may be secured by the safety mechanism after successful rotation and installation into the HVAC assembly.

In step 1230, the scroll housing subassembly may be rotated from an installed position to an extraction position. As the serviceability process describes techniques for servicing a scroll housing subassembly in a direction orthogonal to a direction of rotation, the scroll housing subassembly may also be detached and removed from the HVAC assembly in from a position in which the scroll housing subassembly is installed to a position in which the scroll housing subassembly is ready for extraction.

In step 1240, various securing elements distributed on the scroll housing subassembly and an evaporator housing subassembly or an air inlet housing subassembly of the HVAC assembly may be detached or disengaged from each other, as a result of the rotational movement. The scroll housing subassembly may be removed from the HVAC assembly in a direction of extraction, after the scroll housing subassembly reaches the extraction position by rotating axially in a direction orthogonal to a direction of extraction in step 1250. This step may include, for example, disengaging the securing elements through rotating of the scroll housing subassembly and axially moving the scroll housing subassembly to an extraction height that may be smaller than a distance between the scroll housing subassembly and an obstacle in the axial direction. The axial direction may be orthogonal to a direction of extraction. As described above, the blower motor is part of the scroll housing subassembly; thus, by removal of the scroll housing subassembly in step 1250, the blower motor may be serviced without affecting any of the other HVAC subassemblies or requiring removal of hardware connections such as screws and the like.

In one or more embodiments, the method described in FIG. 12 may be used for improving serviceability of a scroll housing subassembly installed in an HVAC system. Additionally, the aforementioned techniques for servicing a blower motor that is part of a scroll housing subassembly may beneficial in reducing the number of parts required to be removed or dismantled when servicing a blower motor of an HVAC assembly. For example, the method as described in FIG. 12 may reduce production and assembling costs because only one component of the HVAC assembly is removed in the servicing process. To this point, the scroll housing subassembly and its surroundings are also manufactured with the aforementioned configurations in mind. Thus, a manufacturing/assembling location may only improve in the servicing operations if the heater core has been manufactured/assembled with the above configurations for serviceability. This may be extra beneficial for scroll housing subassemblies assembled vertically that may be serviced horizontally.

In one or more embodiments, the same configurations and in opposite behavior are applied to the scroll housing subassembly in the process of installing and engaging the scroll housing subassembly with the adjacent subassemblies. As such, an inverse configurations to those shown in FIGS. 1-12 may be needed for installation of the scroll housing subassembly in the HVAC assembly.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for servicing a blower motor installed in a heating, ventilation, and air-conditioning (HVAC) assembly fora motor vehicle, the method comprising:
    rotating a scroll housing subassembly comprising a scroll housing and the blower motor of the HVAC assembly from an installed position to an extraction position,
        wherein the blower motor is rigidly attached to the scroll housing, thereby resulting in a joint rotation of the scroll housing and the blower motor when rotating the scroll housing subassembly, and
        wherein the joint rotation is about an axis through the blower motor,
    detaching a first securing element, the first securing element being distributed on the scroll housing subassembly and an evaporator housing subassembly of the HVAC assembly; and
    removing the scroll housing subassembly from the HVAC assembly in a direction of extraction, at the extraction position,
    wherein the scroll housing subassembly reaches the extraction position by axial rotation in a direction orthogonal to the direction of extraction, and
    wherein the extraction position is a position at which the scroll housing subassembly is cleared for moving in the direction of extraction.

2. The method of claim 1, the method further comprising:
    detaching a second securing element, the second securing element being distributed on the scroll housing subassembly and the evaporator housing subassembly; and
    detaching a third securing element, the third securing element being distributed on the scroll housing subassembly and an air inlet housing subassembly of the HVAC assembly.

3. The method of claim 2, the method further comprising:
    identifying a reference point in the scroll housing subassembly, the reference point being an indicator of a location to start rotating the scroll housing subassembly from the installed position; and
    disengaging a safety mechanism of the air inlet housing subassembly, the safety mechanism attaching the air inlet housing subassembly to the scroll housing subassembly.

4. The method of claim 3,
    wherein the reference point is a pin on the scroll housing subassembly that locates a channel in the air inlet housing subassembly, and wherein the safety mechanism is a latch in the air inlet housing subassembly that prevents the scroll housing subassembly from disassembling during transit.

5. The method of claim 2,
wherein the scroll housing subassembly comprises the blower motor and a scrolling portion, the blower motor being attached to the scrolling portion through a plurality of fastening elements,
wherein the evaporator housing subassembly comprises an evaporator, and
wherein the air inlet housing subassembly comprises an entry passageway for transporting air.

6. The method of claim 2,
wherein the second securing element is a radial male wedge and a radial female wedge, the radial male wedge and the female wedge being attached at the installed position of the scroll housing subassembly and the radial male wedge and the female wedge being detached at the extraction position.

7. The method of claim 2,
wherein the third securing element is a plurality of bayonet features, the plurality of bayonet features being attached at the installed position of the scroll housing subassembly and the plurality of bayonet features being detached at the extraction position.

8. The method of claim 1,
wherein the first securing element is an arcing tongue and an arcing groove, the arcing tongue and the arcing groove being attached at the installed position of the scroll housing subassembly and detached at the extraction position.

9. The method of claim 1,
wherein the extraction position comprises an extraction height and an extraction angle,
wherein the extraction height is a distance traveled by the scroll housing subassembly in the direction orthogonal to the direction of extraction from the installed position, and
wherein the extraction angle is an angular distance traveled by twisting the scroll housing subassembly from the installed position.

10. The method of claim 9,
wherein the extraction height is 15 millimeters or less, and
wherein the extraction angle is 40 degrees or less.

11. A heating, ventilation, and air-conditioning (HVAC) assembly for a motor vehicle, the assembly comprising:
a scroll housing subassembly comprising a scroll housing and a blower motor;
an evaporator housing subassembly; and
an air inlet housing subassembly,
a first securing element, the first securing element being distributed on the scroll housing subassembly and the evaporator housing subassembly and configured to detach at an extraction position;
wherein the scroll housing subassembly is configured for rotating from an installed position to the extraction position,
wherein the blower motor is rigidly attached to the scroll housing, thereby resulting in a joint rotation of the scroll housing and the blower motor when rotating the scroll housing subassembly,
wherein the joint rotation is about an axis through the blower motor,
wherein the scroll housing subassembly is configured for removal from the HVAC assembly at the extraction position,
wherein the scroll housing subassembly reaches the extraction position by rotating axially in a direction orthogonal to a direction of extraction, and
wherein the scroll housing subassembly is the only subassembly removed from the HVAC assembly for servicing the blower motor.

12. The assembly of claim 11, the assembly further comprising:
a second securing element, the second securing element being distributed on the scroll housing subassembly and the evaporator housing subassembly and configured to detach at the extraction position; and
a third securing element, the third securing element being distributed on the scroll housing subassembly and the air inlet housing subassembly and configured to detach at the extraction position.

13. The assembly of claim 12,
wherein the second securing element is a radial male wedge and a radial female wedge, the radial male wedge and the radial female wedge being attached at the installed position of the scroll housing subassembly and the radial male wedge and the radial female wedge being detached at the extraction position.

14. The assembly of claim 12,
wherein the third securing element is a plurality of bayonet features, the plurality of bayonet features being attached at the installed position of the scroll housing subassembly and the plurality of bayonet features being detached at the extraction position.

15. The assembly of claim 11, the assembly further comprising:
a reference point in the scroll housing subassembly, the reference point being an indicator of a location to start rotating the scroll housing subassembly from the installed position; and
a safety mechanism of the air inlet housing subassembly, the safety mechanism attaching the air inlet housing subassembly to the scroll housing subassembly.

16. The assembly of claim 15,
wherein the reference point is a pin on the scroll housing subassembly that locates a channel in the air inlet housing subassembly, and
wherein the safety mechanism is a latch in the air inlet housing subassembly that prevents the scroll housing subassembly from disassembling during transit.

17. The assembly of claim 11,
wherein the scroll housing subassembly comprises a blower motor and a scrolling portion, the blower motor being attached to the scrolling portion through a plurality of fastening elements,
wherein the evaporator housing subassembly comprises an evaporator, and
wherein the air inlet housing subassembly comprises an entry passageway for transporting air.

18. The assembly of claim 11,
wherein the first securing element is an arcing tongue and an arcing groove, the arcing tongue and the arcing groove being attached at the installed position of the scroll housing subassembly and the arcing tongue and the arcing groove being detached at the extraction position.

19. The assembly of claim 11,
wherein the extraction position comprises an extraction height and an extraction angle, wherein the extraction height is a distance traveled by the scroll housing subassembly in the direction orthogonal to the direction of extraction from the installed position, and wherein the extraction angle is an angular distance traveled by twisting the scroll housing subassembly from the installed position.

20. The assembly of claim 19, wherein the extraction height is 15 millimeters or less, and wherein the extraction angle is 40 degrees or less.

21. A scroll housing subassembly installed in a heating, ventilation, and air-conditioning (HVAC) assembly for a motor vehicle, the subassembly comprising:

a scroll housing;

a blower motor;

a first securing element, the first securing element being distributed on the scroll housing subassembly and an evaporator housing subassembly and configured to detach at an extraction position;

a second securing element, the second securing element being distributed on the scroll housing subassembly and the evaporator housing subassembly and configured to detach at the extraction position; and a third securing element, the third securing element being distributed on the scroll housing subassembly and an air inlet housing subassembly and configured to detach at the extraction position, wherein the scroll housing subassembly is configured for rotation from an installed position to the extraction position, wherein the blower motor is rigidly attached to the scroll housing, thereby resulting in a joint rotation of the scroll housing and the blower motor when rotating the scroll housing subassembly, wherein the joint rotation is about an axis through the blower motor, wherein the scroll housing subassembly is configured for removal from the HVAC assembly at the extraction position, wherein the scroll housing subassembly reaches the extraction position by axial rotation in a direction orthogonal to a direction of extraction, and wherein the scroll housing subassembly is the only subassembly removed from the HVAC assembly for servicing the blower motor.

* * * * *